United States Patent [19]
Naito

[11] Patent Number: 5,155,419
[45] Date of Patent: Oct. 13, 1992

[54] BRUSHLESS MOTOR DRIVE CIRCUIT HAVING A HIGHLY ACCURATE SINUSOIDAL OUTPUT SIGNAL

[75] Inventor: Hayato Naito, Komagane, Japan

[73] Assignee: Sankyo Seiki Mfg. Co., Ltd., Nagano, Japan

[21] Appl. No.: 598,238

[22] Filed: Oct. 16, 1990

[30] Foreign Application Priority Data

Oct. 19, 1989 [JP] Japan ................................. 1-272127

[51] Int. Cl.$^5$ ............................................. H02P 6/00
[52] U.S. Cl. .................................... 318/254; 318/439
[58] Field of Search ............... 318/254, 138, 439, 599, 318/696, 685

[56] References Cited

U.S. PATENT DOCUMENTS

| | | |
|---|---|---|
| 4,633,150 | 12/1986 | Inaji et al. ............................ 318/254 |
| 4,658,190 | 4/1987 | Miyazaki et al. ..................... 318/254 |
| 4,686,437 | 8/1987 | Langley et al. ...................... 318/254 |
| 4,700,116 | 10/1987 | Inoue et al. .......................... 318/254 |
| 4,748,386 | 5/1988 | Nakanishi et al. ................... 318/254 |
| 4,950,968 | 8/1990 | Ogura ............................ 318/254 X |
| 5,006,768 | 4/1991 | Rozman ............................... 318/254 |

Primary Examiner—William M. Shoop, Jr.
Assistant Examiner—A. Jonathan Wysocki
Attorney, Agent, or Firm—McAulay Fisher Nissen Goldberg & Kiel

[57] ABSTRACT

A drive circuit for driving a brushless motor includes a rotor magnet with m (m=integer) different phases for rotatatively driving the rotor magnet. A total of k (k=integer) locating devices, such as Hall elements, are employed for detecting the rotary position of the rotor magnet and for generating output signals representing the detected position. A total of m controlling and multiplying circuits are included, each responsive to the output signal from the corresponding one of the k locating devices at one of its input terminals. The drive circuit includes m output amplifiers, each for receiving the output signal from the corresponding one of the m controlling and multiplying circuits to provide m output voltage to drive the drive coils. M repetitive multipliers are included for repetitively multiplying each of the output voltages by itself until the sum of the powers of the output voltages reaches a given value. The exponent of the repetitive multiplication is an even number. A control section feeds back the output voltages from repetitive multiplication to the other input terminals of each of the controlling and multiplying circuits to provide highly accurate sinusoidal voltages to the motor.

7 Claims, 7 Drawing Sheets

BRUSHLESS MOTOR DRIVE CIRCUIT HAVING A HIGHLY ACCURATE SINUSOIDAL OUTPUT SIGNAL

FIELD OF THE PRESENT INVENTION

This invention relates to a brushless motor drive circuit, and, more particularly, to improvements in such circuits for providing highly accurate sinusoidal waveforms to a brushless motor.

BACKGROUND OF THE PRIOR ART

A known brushless motor drive circuit as disclosed in Japanese Patent Disclosure No. 58-93482 typically comprises two-phase drive coils for rotatively driving a rotor magnet and a pair of Hall devices for detecting the rotary position of the rotor magnet, a pair of amplifying means for respectively amplifying output signals from the Hall devices, a pair of controlling and multiplying means for multiplying the respective outputs by a reference voltage, output signals from the controlling and multiplying means for controlling the operation of the drive coils, and squaring means for squaring the output voltages being applied to the two-phase drive coils and for feeding back the product of the squarings to the Hall devices.

Figure 9:
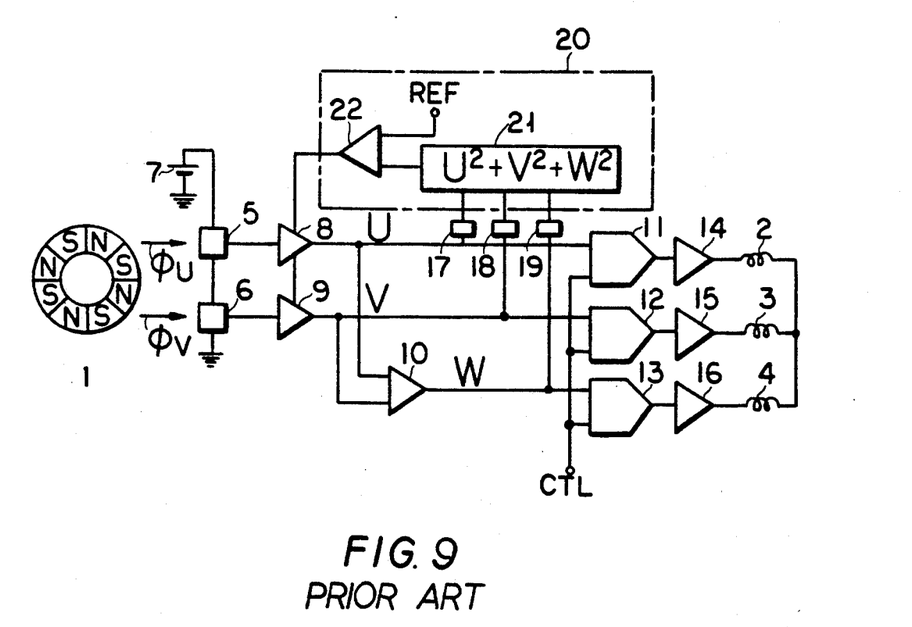
FIG. 9 is a block diagram of a conventional brushless motor drive circuit.

Another known brushless motor drive circuit as illustrated in FIG. 9 comprises a rotor magnet 1 having $2n$ (n=integer) magnetized poles, 3-phase drive coils 2, 3, 4 for rotatively driving said rotor magnet 1 and locating means 5, 6 operated by a given electric current supplied from a power source 7 for locating the rotary position of the rotor magnet 1 by detecting the magnetic fields $\phi u$, $\phi v$ of the rotor magnet 1. Amplifying means 8, 9 amplify output signals from the Hall devices 5, 6 and synthesizing means 10 adds and inverts the output signals U, V of the respective amplifying means 8, 9 to synthetically form a signal $W = -(U+V)$ having a third phase. Controlling and multiplying means 11, 12, 13 respectively multiply the output signals U, V and W by a speed control signal CTL and the products of the multiplications are respectively amplified by output amplifying means 14, 15, 16 before they are respectively fed to 3-phase drive coils 2, 3, 4. The output signals U and V of the amplifying means 8, 9 and the output signal W of the synthesizing means 10 are respectively and repeatedly multiplied by themselves in repetitively multiplying operation means 17, 18, 19, an even number being provided as exponent for the repeated multiplications so that the sum of the products becomes equal to a given value. In control section 20, output signals $U^2$, $V^2$ and $W^2$ of the repetitively multiplying operation means 17, 18, 19 are added by adder 21 and the output signal of the adder 21 is compared with reference voltage REF by comparator 22 and an error signal, if any, is fed back to the amplifying means 8, 9 which function as so many multipliers and amplifiers. The feedback loop system controls the gain of the amplifying means in such a manner that the relationship $U^2 + V^2 + W^2 = REF$ is always maintained. This prior approach is disclosed in U.S. Pat. No. 4,658,190.

OBJECTS OF THE PRESENT INVENTION

Figure 10A:
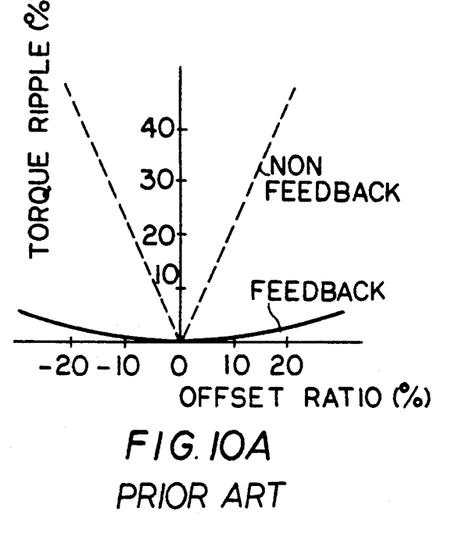
FIGS. 10(a) through (d) are graphic representations of the relationship between the torque ripple and the unbalanced voltages of the Hall devices as well as the relationship between the torque ripple and the deviation of the amplifying means of a conventional brushless motor drive circuit.
Figure 10B:
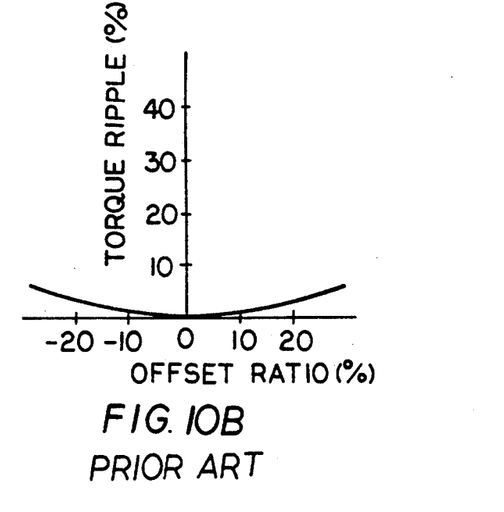
Figure 10C:
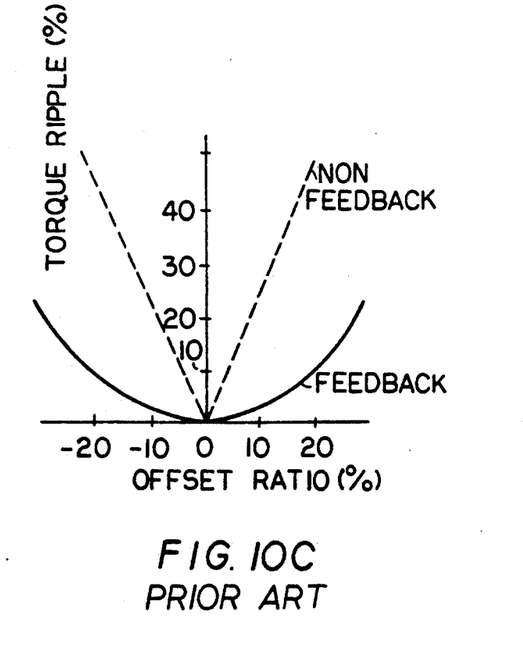
Figure 10D:
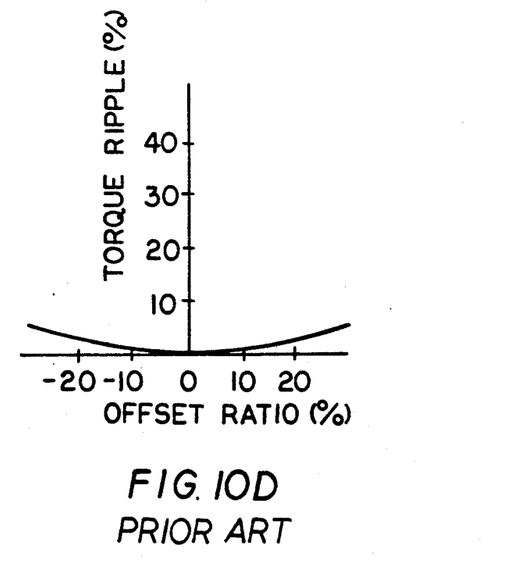

While the brushless motor drive circuit disclosed in Japanese Patent Disclosure No. 58-93482 can correct deviations of the Hall devices as the output signals of the squaring means are fed back to them, it can hardly, if ever, correct deviations that may exist in the amplifying means and/or the controlling and multiplying means which are located downstream to the Hall devices and, consequently, the torque ripple of the brushless motor is boosted by the deviations that can not be corrected. FIG. 10($a$) shows the relationship between the torque ripple and the unbalanced voltage of the Hall devices of a brushless motor of this type, while FIG. 10($c$) shows the relationship between the torque ripple and the deviation of the amplifier of the brushless motor. As is clearly seen from these illustrations, the deviation of the amplifying means is scarcely corrected and, consequently, a significantly large torque ripple is generated in the brushless motor. It should also be noted that the deviation in the controlling and multiplying means is not significantly corrected so that the magnitude of the torque ripple of the brushless motor is made even greater.

In the brushless motor drive circuit as illustrated in FIG. 9, the relationship between the torque ripple and the unbalanced voltage of the Hall devices will be as shown in FIG. 10($b$), while the relationship between the torque ripple and the deviation of the amplifying means will be as shown in FIG. 10($d$). It should be noted that errors that may exist in the portion of the circuit which are found downstream to the feedback loop are not corrected at all, making the torque of the brushless motor uneven and unstable as they remain in the form of waveform errors in the electric currents through the drive coils 2, 3, 4.

It is therefore an object of the present invention to provide a brushless motor drive circuit that can ensure electric currents with highly accurate sinusoidal waveforms by correcting any circuit errors and by overcoming the above described problems of existing drive circuits.

In accordance with the invention, in a drive circuit for driving a brushless motor having a rotor magnet with m (m=integer) different phases for rotatively driving the rotor magnet and where a total of k (k=integer) locating means are employed for detecting the rotary position of the rotor magnet and for generating output signals representing the detected position, the circuit further comprising a total of m controlling and multiplying means, each responsive to the output signal from the corresponding one of the k locating means at one of its input terminals, m output amplifying means, each for receiving the output signal from the corresponding one of the m controlling and multiplying means to provide m output voltages to drive said drive coils, m repetitive computing means for repetitively multiplying each of the output signal from the m output amplifying means by itself until the sum of the powers of the output signal reaches a given value. The exponent of the repetitive multiplication is an even number. Also included is a control section for feeding back the output voltages from the m repetitively computing means to the other input terminals of each of said m controlling and multiplying means in order to provide highly accurate sinusoidal voltages to the motor.

For a better understanding of the present invention, reference is made to the following description and accompanying drawings while the scope of the invention will be pointed out in the appended claims.

DESCRIPTION OF THE PREFERRED EMBODIMENTS

Figure 1:
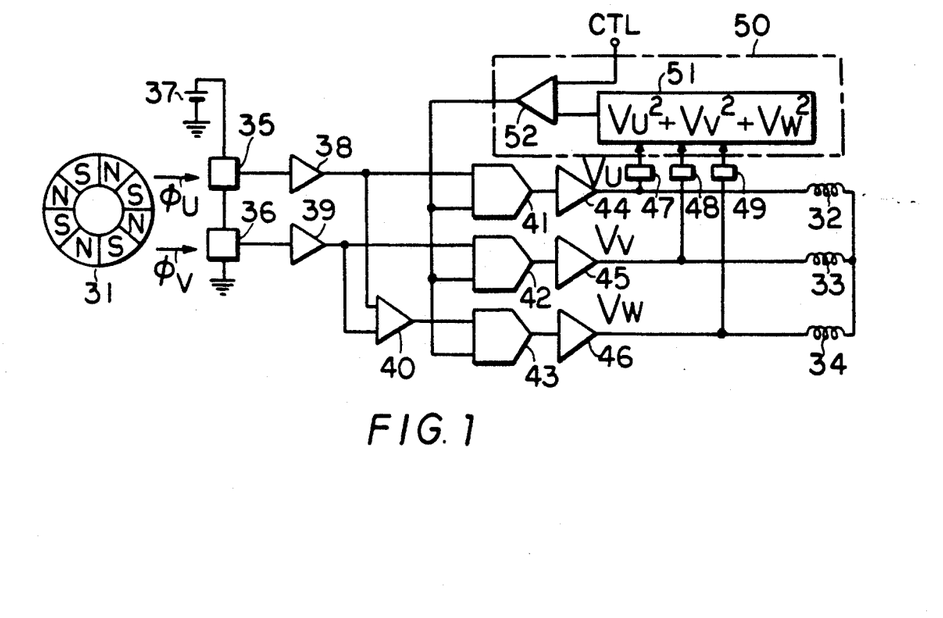
FIG. 1 is a block diagram of a first embodiment of the invention.

FIG. 1 illustrates a first embodiment of the invention.

This embodiment comprises a rotor magnet having $2n$ (n:integer) magnetized poles which are rotatively driven by 3-phase drive coils 32, 33, 34 and a pair of locating means 35, 36, each consisting of a Hall device and being powered by a power source 37 at a given level, for locating the rotary position of the rotor magnet 31 by detecting the magnetic fields $\phi u$ and $\phi v$ generated by the rotor magnet 31. The Hall devices 35, 36 are arranged so that they have a phase difference of 120° (electrical angle), although the Hall devices may be replaced by other locating means. The output voltages of the Hall devices 35, 36 exhibit sinusoidal waveforms having a phase difference of 120° electrical angle since the magnetic distribution of the rotor magnet 31 presents a sinusoidal waveform running in the direction of rotation. Amplifiers 38, 39 amplify the output voltages of the Hall devices 35, 36 and synthesizer 40 performs addition and inversion of the output signals of the amplifiers 38, 39 to synthetically produce a signal having a third phase. The output signals of the amplifiers 38, 39 and the synthesizer 40 are supplied to respective ones of the input terminals of controlling and multiplying means 41, 42, 43, whose output signals are amplified by respective output amplifiers 44, 45, 46 and then supplied to the 3-phase drive coils 32, 33, 34. The controlling and amplifying means 41, 42, 43 and the output amplifiers 44, 45, 56 comprise a drive coil circuit. Meanwhile, each of the output signals of the output amplifiers 44, 45, 46 is repeatedly multiplied by itself by means of a corresponding one of repetitive multipliers 47, 48, 49 until the sum of the powers of the repetitive multiplications by the repetitive multipliers 47, 48, 49 reaches a predetermined value, the number of the exponent for the repetitive multiplications being an even number. In control section 50, the output signals of the repetitive multipliers 47, 48, 49 are added by an adder 51, whose output signal is compared with speed control signal CTL by a comparator 52; a signal representing the difference is fed back to the other ones of the input terminals of the controlling and multiplying means 41, 42, 43. It should be noted that the speed control signal CTL is kept pulsating in order to maintain the speed of the brushless motor constant.

Since the output signals of the output amplifiers, which constitute the final stage of the drive circuit, are supplied to the control means 50, the circuit is totally encompassed by the feedback mechanism with the exception of the drive coils 32, 33, 34 which are found downstream to the feedback loop in this embodiment. Accordingly, any errors that may occur in the circuit can be effectively corrected.

Moreover, since feedback signals are applied to the input terminals of the controlling and multiplying means 41, 42, 43, errors can be corrected more satisfactorily than in the case where such signals are applied to the amplifier 38, 39 although the effect of correction on the amplifiers 38, 39 are almost identical with that of the brushless motor drive circuit as illustrated in FIG. 9.

FIGS. 5(a) through (d) illustrate the effect of the feedback mechanism in different aspects. While FIGS. 5(b) and (d) respectively show the relationship between the torque ripple and the deviation in the amplifiers 38, 39 and the relationship between the torque ripple and the deviation in the controlling and multiplying means 41, 42, 43 before the feedback mechanism is applied thereto, FIGS. 5(a) and (c) respectively show their counterparts after application of the feedback mechanism. It has been proved that the ratio of the deviation to the torque ripple in the amplifiers 38, 39 almost the same and that of the deviation to the torque ripple in the controlling and multiplying means 41, 42, 43 is one third of their counterparts in the brushless motor drive circuit illustrated in FIG. 9 thereby making the overall ratio of the deviation to the torque ripple one third of its counterpart.

It should also be noted that a speed control signal CTL is introduced to the terminal of the comparator in the control section 50 of this embodiment for comparison with the output signal of the adder 51, whereas a reference voltage REF is used in a convention drive circuit, so that the circuitry can be used to control the speed of the brushless motor.

Figure 8:
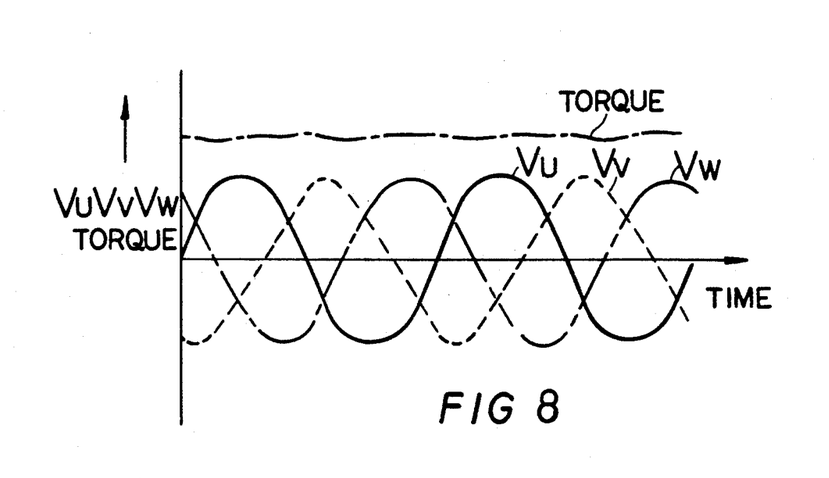
FIGS. 8(a) and 8(b) are graphic representations similar to FIG. 6(a) and (b) for the first embodiment.

It should be further noted that a signal having a third phase is synthetically formed from the output signals of the amplifiers 38, 39 by means of a synthesizing means 40 so that the middle point of each of the signals with different phases is always balanced with the other middle points or the signals with different phases are kept in a balanced condition, constantly maintaining the starting point of the vector formed by the signals at a given point. Consequently, the peak amplitudes of the signals with three different phases become identical so that the voltage of the power source may be fully exploited to significantly increase the efficiency of utilization of the power source. FIG. 8(a) shows the output signals Vu, Vv, Vw with different phases as well as the torque of the brushless motor driven by the embodiment when the feedback mechanism is not applied to the controlling and multiplying means 41, 42, 43 by the control section 50, whereas FIG. 8(b) shows the output signals Vu, Vv, Vw with different phases as well as the torque of the brushless motor driven by the embodiment when the feedback mechanism is applied to the controlling and multiplying means 41, 42, 43 by the control section 50. It will be seen that, if the output signals from the Hall devices 35, 36 are detection signals with different amplitudes as shown in FIG. 8(a), the amplitudes of the output signals Vu, Vv, Vw are normalized to have an identical value which is equal to the limit posed by the source voltage.

Figure 2:
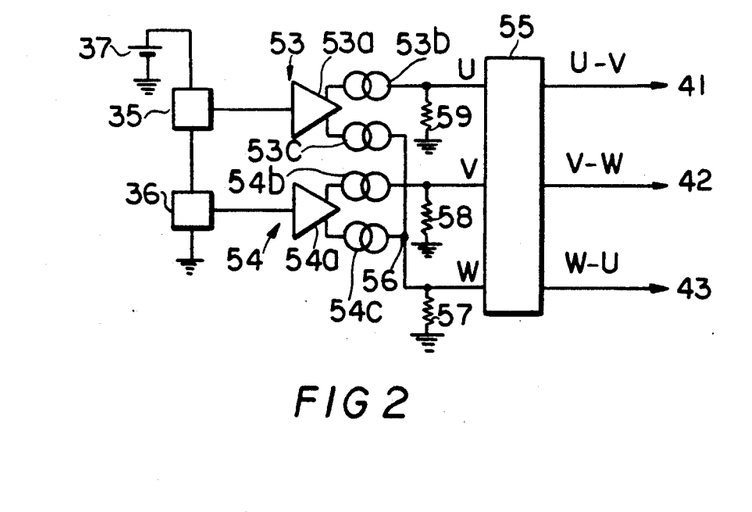
FIG. 2 is a block diagram of a second embodiment of the invention.

FIG. 2 illustrates a second embodiment of the invention.

In this embodiment, the amplifiers 38, 39 of the first embodiment are replaced by amplifiers 53, 54 and a 30° phase shift circuitry 55 is additionally used. The amplifiers 53, 54 are respectively constituted by main sections 53a, 54a, non-inverting current output sections 53b, 54b and inverting current output sections 53c, 54c, the output terminals of the inverting current output sections 53c, 54c being mutually short-circuited and the point of short-circuit 56 and the non-inverting current output sections 53b, 54b being connected to the ground respectively by way of resistors 57, 58, 59. The output signals of the Hall devices 35, 36 are respectively amplified by the main section 53a, 54a and transmitted from the non-inverting current output sections 53b, 54b as so many non-inverting currents, while they are at the same time transmitted from the inverting current output sections 53c, 54c as inverting currents. The non-inverting output currents from the non-inverting current output sections 53b, 54b are respectively converted into voltage signals u, v by the resistors 58, 59, whereas the inverting output currents from the inverting current output sections 53c, 54c are added together at the short-circuit point 56 and then converted into a voltage signal w by the resistor 57. The 30° phase shift circuitry 55 converts the signals u, v, w with three different phases into signals u-v, v-w, w-u and transmits them to the respective controlling and multiplying means 41, 42, 43.

Since synthesizing means 40 which exists in the first embodiment is omitted in the second embodiment, the latter has a simplified circuit configuration and therefore can be produced at a reduced cost.

Figure 3:
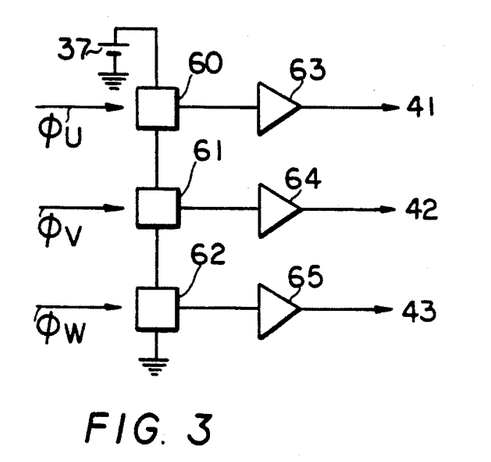
FIG. 3 is a block diagram of a third embodiment of the invention.

FIG. 3 depicts a third embodiment of the invention.

In this embodiment, the Hall devices 35, 36, the amplifying means 38, 39 and the synthesizing means 40 of the first embodiment of FIG. 1 are replaced respectively by Hall devices 60, 61, 62 and amplifying means 63, 64, 65. The Hall devices 60, 61, 62 are powered by power source 37 at a constant rate and locate the rotary position of the rotor magnet 31 by detecting magnetic fields $\phi u$, $\phi v$, $\phi w$ generated by the rotor magnet 31, thereby transmitting detection signals with three different phases which are shifted from one another by 120°. The output signals of the Hall devices 60, 61, 62 are respectively boosted by the amplifying means 63, 64, 65 and then transmitted to the controlling and multiplying means 41, 42, 43.

Figure 7A:
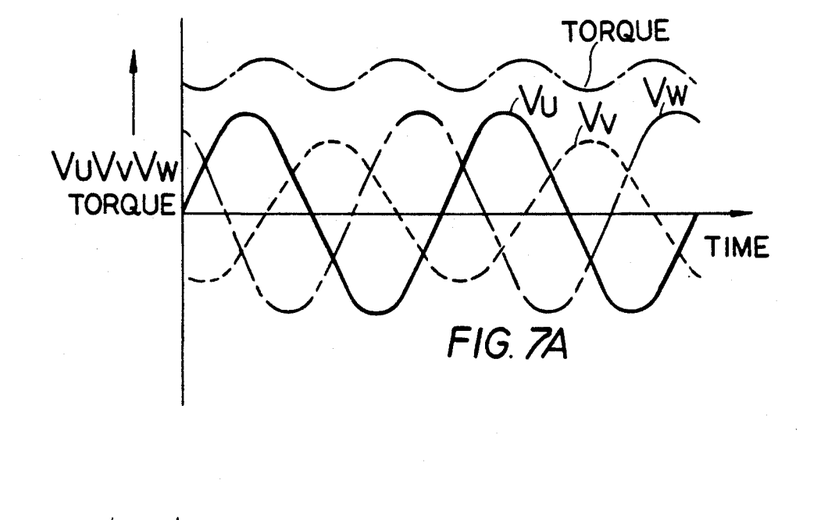
FIGS. 7(a) and (b) are graphic representations similar to FIG. 6(a) and (b) for the third embodiment.
Figure 7B:
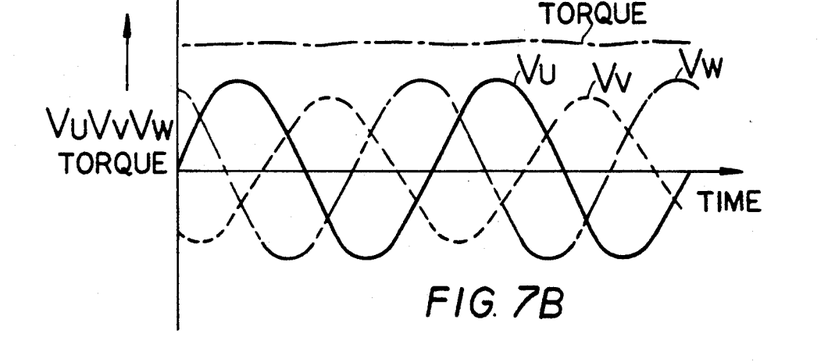

FIG. 7(a) shows the output signals Vu, Vv, Vw with different phases as well as the torque of the brushless motor driven by the embodiment when the feedback mechanism is not applied to the controlling and multiplying means 41, 42, 43 by the control section 50, whereas FIG. 7(b) shows the output signals Vu, Vv, Vw with different phases as well as the torque of the brushless motor driven by the embodiment when the feedback mechanism is applied to the controlling and multiplying means 41, 42, 43 by the control section 50. It will be seen that, in this embodiment, the middle points of the output signals Vu, Vv, Vw with three different phases are not definite or, rather, they are kept indefinite so that the torque of the brushless motor is maintained at a constant level by feeding back the output signals Vu, Vv, Vw with three different phases, the torque ripple consequently becoming smaller than those of the preceding embodiments. Therefore, the amplitudes of the output signals Vu, Vv, Vw are not kept constant and differ from one another. As a result, the efficiency of exploiting the power source will be reduced as compared with the preceding embodiments because the largest of the amplitudes of the output signals Vu, Vv, Vw with three different phases cannot reach the maximum limit.

Figure 4:
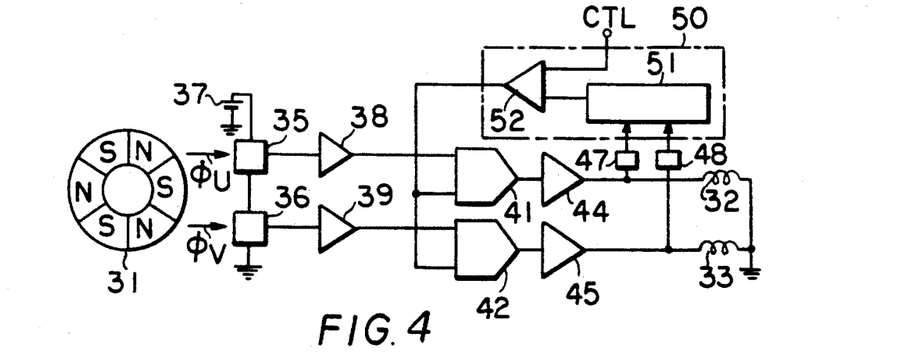
FIG. 4 is a block diagram of a fourth embodiment of the invention.
Figure 5A:
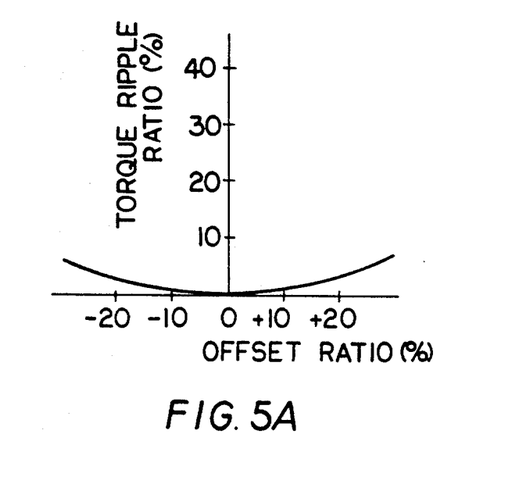
FIGS. 5(a) through (d) are graphic representations of the relationship between the torque ripple and the deviation of the amplifying means and the relationship between the torque ripple and the deviation of the controlling and multiplying means of the first embodiment.
Figure 5B:
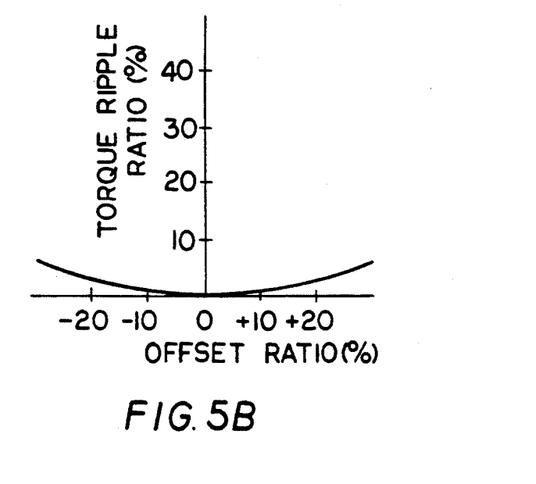
Figure 5C:
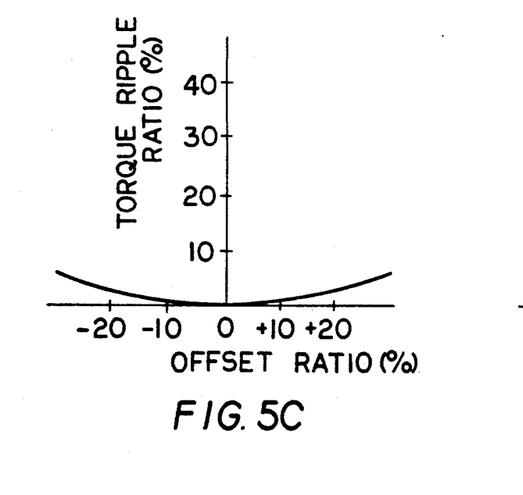
Figure 5D:
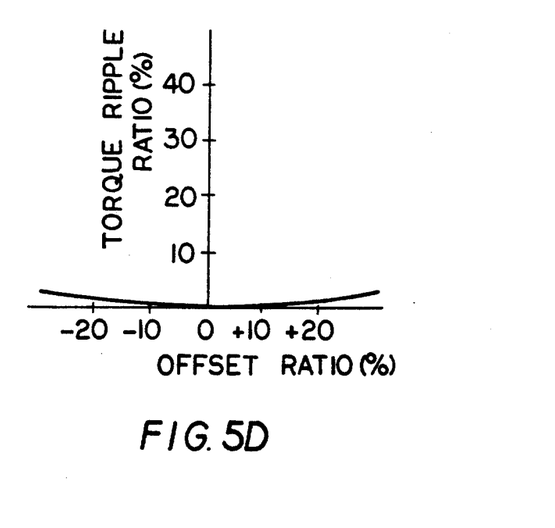

FIG. 4 illustrates a fourth embodiment of the invention.

In this embodiment, the synthesizing means 40, the controlling and multiplying means 43, the output amplifying means 46 and the repetitively multiplying means 49 of the first embodiment are omitted so that the rotor magnet 31 of the brushless motor is driven by 2-phase drive coils 32, 33.

Figure 6A:
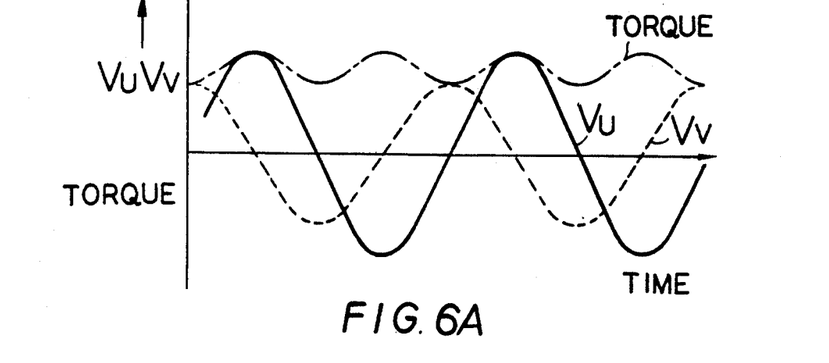
FIGS. 6(a) and (b) are graphic representations of the waveforms of the output signals with different phases and the torque of the brushless motor of the fourth embodiment respectively when the feedback mechanism is not applied and when the mechanism is applied.
Figure 6B:
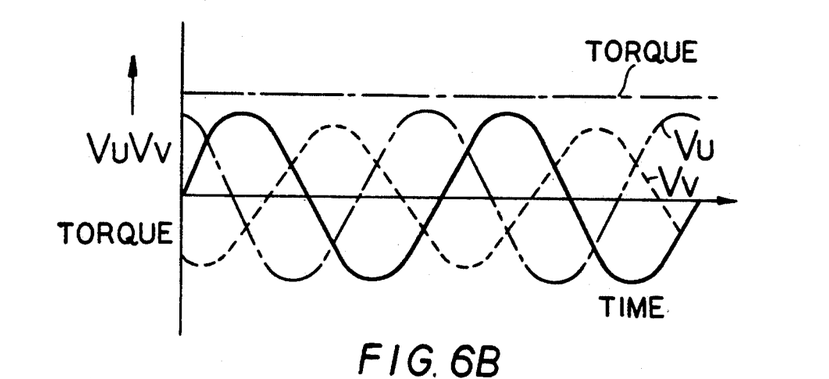

FIG. 6(a) shows the output signals Vu, Vv with different phases as well as the torque of the brushless motor driven by the embodiment when the feedback mechanism is not applied to the controlling and multiplying means 41, 42 by the control section 50, whereas FIG. 6(b) shows the output signals Vu, Vv with different phases as well as the torque of the brushless motor driven by the embodiment when the feedback mechanism is applied to the controlling and multiplying means 41, 42 by the control section 50. It will be seen that, since there are only two output signals with phases that differ from each other by 90° in this embodiment, the duration of time in which the drive coils are not energized is longer than that of the other embodiments, reducing the efficiency of energizing as well as that of the brushless motor.

Figure 11:
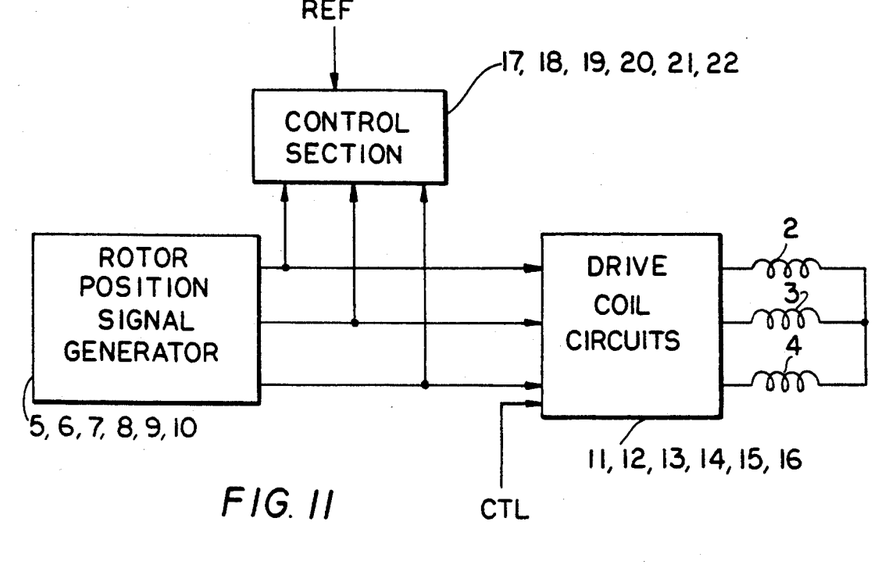
FIG. 11 is a simplified block diagram illustration of the basic arrangement of the prior art.

FIG. 10 is essentially a representation of the prior art arrangement shown in FIG. 9 in a simplified form. The important relationship shown in FIG. 9 should be noted that the control section 17-22 is a block that is used to include the multiplier element 17, 18 and 19. This control section 17-22 is responsive to the rotor position signals to provide a feedback signal to the motor position signal generator 5-10.

Furthermore in FIG. 11, as in FIG. 9, it is applied as an input directly to the drive control circuits as is their rotor positions signals. FIG. 11 simplifies FIG. 9 somewhat, for schematic purposes, in that the reference signal CTL is shown as a signal line input to the drive control circuits 11-16 while the rotor position signals are shown as three inputs.

As can be seen in FIG. 9, the circuitry of the drive control circuits are such that the CTL is in fact applied at three separate inputs to the multipliers 11, 12 and 13. However, for purposes of comparing FIG. 11 with FIG. 12, this simplification is instructive.

Figure 12:
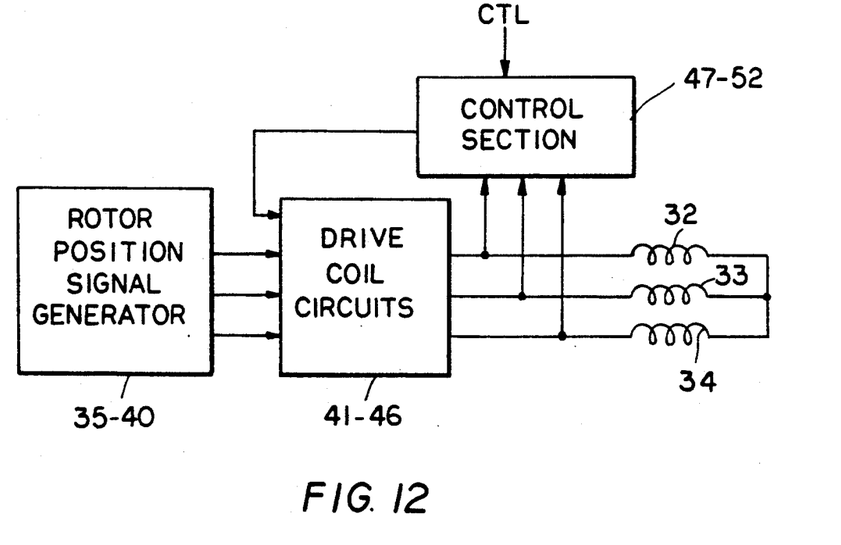
FIG. 12 is a simplified block diagram illustration with the basic arrangement of a circuit arrangement of this invention.

FIG. 12 shows that the control section 47-52 has as its inputs the outputs of the drive control circuits 41 and 46 rather than the outputs of the rotor position signal generators 35-40. Furthermore, the control section feedback signal is applied directly to the drive control circuit arrangement 41-46 in the same fashion as is the reference signal CTL in the FIG. 11 arrangement. However, the reference signal CTL in the FIG. 12 arrangement is applied to the control section 47–52 and by influencing the output of the control section has an affect upon the input to the drive control circuits.

As is apparent from the above description, a brushless motor drive circuit according to the invention can ensure electric currents with highly accurate sinusoidal waveforms by correcting any circuit errors through application of a feedback mechanism from the output side of the output amplifying means. Moreover, any deviations of the output of the controlling and multiplying means can be further corrected through application of the feedback mechanism to them in order to further reduce circuit errors.

While the foregoing description and drawings represent the preferred embodiments of the present invention, it will be obvious to those skilled in the art that various changes and modifications may be made therein without departing from the true spirit and scope of the present invention.

What is claimed is:

1. In a motor drive circuit for driving a brushless motor having a rotor magnet with $2n$ ($n$ = integer) magnetized poles, drive coils with m (m = integer) different phases for rotatively driving said rotor magnet and where a total of k (k = integer) locating means are employed for detecting the rotary position of said rotor magnet and for generating output signals representing the detected position, the circuit further comprising a total of m controlling and multiplying means each responsive to the output signal from the corresponding one of said k locating means at one of its input terminals, m output amplifying means, each for receiving the output signal from the corresponding one of said m controlling and multiplying means to provide m output voltages to drive said drive coils, m repetitive computing means for repetitively multiplying each of the output signals from the m output amplifying means by itself until the sum of the powers of the output signals reaches a given value, the exponent of the repetitive multiplication being an even number, and a control section for feeding back the output voltages from the m repetitively computing means to the other input terminals of each of said m controlling and multiplying means in order to provide highly accurate sinusoidal driving voltages to said motor.

2. A motor drive circuit according to claim 1, wherein the drive coils for rotatively driving the rotor magnet are three-phase drive coils, wherein two locating means are provided for detecting the rotary position of said rotor magnet, one of said locating means generating output signals having a phase shifted from that of the output signal of the other means by an electrical angle of 120°, and wherein the circuit further comprises synthesizing means for synthesizing signals having a third phase from the output signals of said two locating means.

3. A motor drive circuit according to claim 1 wherein the drive coils for rotatively driving the rotor magnet are three-phase drive coils, wherein two locating means are provided for detecting the rotary position of said rotor magnet, one of said locating means generating output signals having a phase shifted from that of the other means by an electrical angle of 120°, and wherein the circuit further comprises means for generating three difference signals, two such difference signals representing the difference between each of said locating means output signals and a third signal phase shifted 120° from each of said other two signals and a third difference signal representing the difference between said two locating means output signal, said three difference signals being supplied to said controlling and multiplying means.

4. A motor drive circuit according to claim 1 wherein the drive coils for rotatively driving the rotor magnet are three-phase drive coils, wherein three locating means are provided for detecting the rotary position of said rotor magnet, said locating means generating output signals which are phase shifted from one another by an electrical angle of 120°, said controlling and multiplying means being responsive to said output signals.

5. A motor drive circuit according to claim 1 wherein the drive coils for rotatively driving the rotor magnet are two phase coils, two locating means being provided for detecting the rotary position of said rotor magnet, said locating means generating output signals which are phase shifted from each other by an electrical angle of 90°, said controlling and multiplying means being responsive to said output signals.

6. In a motor drive circuit for driving a brushless motor having a rotor magnet with $2n$ ($n$ = integer) magnetized poles and drive coils with m (m = integer) different phases for rotatively driving said rotor magnet, means for developing m rotor position signals, m drive coil circuits coupled to said m rotor position signals, and a control section responsive to operating parameter input signals and to a predetermined reference signal for providing a feedback control signal, the improvement comprising:

said operating parameter input signals being the output signals of said drive coil circuits,
said predetermined reference signal applied to said control section being a pulse speed control signal,
said feedback signal being coupled to the input of said drive coil circuits, and
the outputs of said drive control circuits being a function of said rotor position signals and said feedback signal from said control section.

7. The improvement of claim 1 wherein said operating parameter input signals are the input signals to the drive coils.

* * * * *